United States Patent
Mackel et al.

(10) Patent No.: US 8,845,505 B2
(45) Date of Patent: Sep. 30, 2014

(54) SEPARATOR COMPRISING A DIRECT DRIVE WITH AN ELASTICALLY SUPPORTED MOTOR

(75) Inventors: Wilfried Mackel, Lippetal-Herzfeld (DE); Thomas Bathelt, Oelde (DE); Andreas Penkl, Lippetal (DE); Thomas Kleimann, Oelde (DE); Marie-Theres Sedler, Wadersloh (DE)

(73) Assignee: GEA Mechanical Equipment GmbH, Oelde (DE)

( * ) Notice: Subject to any disclaimer, the term of this patent is extended or adjusted under 35 U.S.C. 154(b) by 1053 days.

(21) Appl. No.: 12/747,603

(22) PCT Filed: Nov. 25, 2008

(86) PCT No.: PCT/EP2008/066166
§ 371 (c)(1), (2), (4) Date: Jun. 25, 2010

(87) PCT Pub. No.: WO2009/074451
PCT Pub. Date: Jun. 18, 2009

(65) Prior Publication Data
US 2010/0255976 A1    Oct. 7, 2010

(30) Foreign Application Priority Data
Dec. 13, 2007   (DE) .......................... 10 2007 060 588

(51) Int. Cl.
*B04B 9/04*   (2006.01)
*B04B 9/14*   (2006.01)

(52) U.S. Cl.
USPC ................................. 494/15; 494/82; 494/84

(58) Field of Classification Search
USPC .................. 494/1, 12, 16, 20, 82–84, 14–15, 494/60–61; 68/23.1, 23.3; 464/180; 210/144, 363; 74/572, 574; 184/6.18; 384/465, 473
See application file for complete search history.

(56) References Cited

U.S. PATENT DOCUMENTS 1,551,140 A * 8/1925 Edstrom ........................ 384/473
4,946,433 A * 8/1990 Gorodissky et al. ............ 494/15
(Continued)

FOREIGN PATENT DOCUMENTS

| DE | 1 057 979 | 2/1956 |
| DE | 43 14 440 | 6/1994 |

(Continued)

OTHER PUBLICATIONS

Notification of Transmittal of the International Search Report and the Written Opinion of the International Searching Authority, or The Declaration for PCT/EP2008/066166, filed Nov. 25, 2008.

(Continued)

*Primary Examiner* — Charles Cooley
(74) *Attorney, Agent, or Firm* — Crowell & Moring LLP

(57) ABSTRACT

A separator includes a centrifugal drum having a vertical axis of rotation and a feed line for material to be centrifuged. A drive spindle for the centrifugal drum is rotatably mounted on a housing via a bearing, the housing being supported elastically on a machine frame. A drive device includes a motor housing and an electric motor having a stator and an armature which is aligned with the drive spindle. The drive device and the motor housing move with the drive spindle as co-vibrating units during an operation of the separator. The drive device is connected to the machine frame below the bearing at a lower axial end of the bearing via one or more joint elements.

14 Claims, 1 Drawing Sheet

(56) References Cited

U.S. PATENT DOCUMENTS

| | | | |
|---|---|---|---|
| 5,051,007 A * | 9/1991 | Maddox et al. | 384/606 |
| 5,848,959 A * | 12/1998 | Droste et al. | 494/15 |
| 6,224,533 B1 * | 5/2001 | Bengtsson et al. | 494/82 |
| 6,267,204 B1 * | 7/2001 | Kristensen et al. | 184/6.16 |
| 6,338,708 B1 * | 1/2002 | Miura et al. | 494/82 |
| 6,354,988 B1 * | 3/2002 | Carson et al. | 494/82 |
| 6,428,460 B1 * | 8/2002 | Appelquist et al. | 494/82 |
| 6,578,670 B1 * | 6/2003 | Klintenstedt et al. | 184/6.16 |
| 6,626,814 B1 * | 9/2003 | Setterberg | 494/15 |
| 6,960,158 B2 * | 11/2005 | Mackel | 494/82 |
| 6,988,980 B2 * | 1/2006 | Moss | 494/15 |
| 7,588,526 B2 * | 9/2009 | Kleimann et al. | 494/15 |
| 7,850,590 B2 * | 12/2010 | Mackel et al. | 494/14 |
| 8,092,362 B2 * | 1/2012 | Kohlstette et al. | 494/82 |
| 8,425,394 B2 * | 4/2013 | Skytt et al. | 494/15 |
| 2005/0065010 A1 * | 3/2005 | Moss | 494/15 |
| 2009/0111676 A1 * | 4/2009 | Kleimann et al. | 494/46 |
| 2009/0233780 A1 * | 9/2009 | Mackel et al. | 494/15 |
| 2009/0253565 A1 * | 10/2009 | Kohlstette et al. | 494/12 |
| 2010/0255976 A1 * | 10/2010 | Mackel et al. | 494/15 |
| 2010/0273625 A1 * | 10/2010 | MacKel et al. | 494/15 |
| 2012/0071313 A1 * | 3/2012 | Mackel et al. | 494/11 |

FOREIGN PATENT DOCUMENTS

| | | |
|---|---|---|
| DE | 198 13 436 | 9/1999 |
| DE | 20 2005 001 539 | 7/2006 |
| DE | 10 2006 011 895 | 9/2007 |
| DE | 26964 | 12/2007 |
| DE | 102007061999 A1 * | 6/2009 |
| FR | 1 287 551 | 3/1962 |
| GB | 344224 | 12/1930 |
| WO | 00/78465 | 12/2000 |
| WO | 2007/125066 | 11/2007 |

OTHER PUBLICATIONS

Written Opinion of the International Searching Authority for PCT/EP2008/066166, filed Nov. 25, 2008.

* cited by examiner

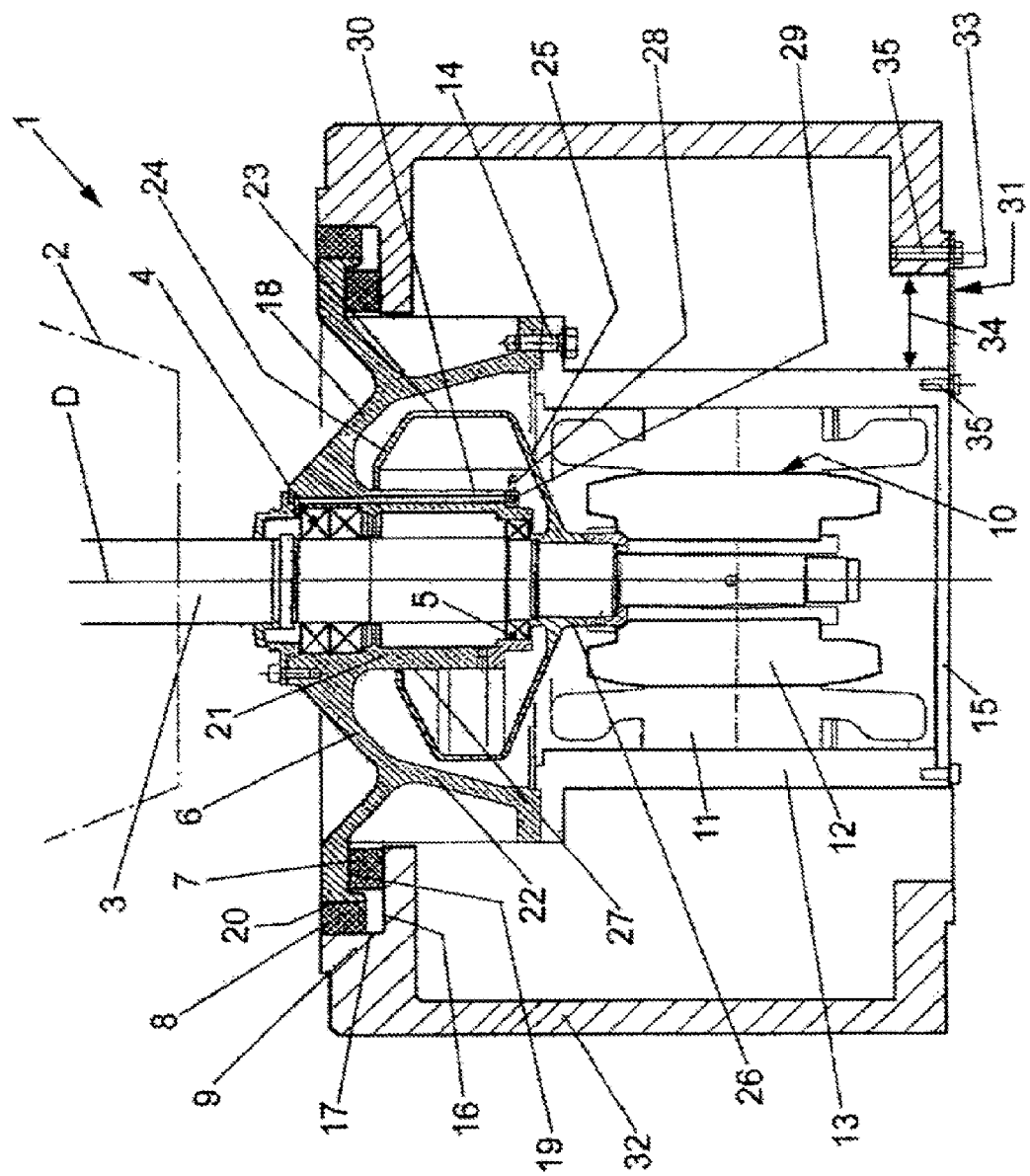

SEPARATOR COMPRISING A DIRECT DRIVE WITH AN ELASTICALLY SUPPORTED MOTOR

CROSS-REFERENCE TO RELATED APPLICATIONS

This application is a National Phase Application of PCT/EP2008/066166, filed on Nov. 25, 2008, which is based upon and claims the benefit of priority to German Patent Application No. 10 2007 060 588.0, filed on Dec. 13, 2007, the contents of both of which are incorporated herein by reference.

BACKGROUND OF THE INVENTION

The present disclosure relates to a separator including a centrifugal drum having a vertical axis of rotation and a feed line for material to be centrifuged. A drive spindle for the centrifugal drum is rotatably mounted on a housing via a bearing. The housing is supported elastically on a machine frame. A drive device includes a motor housing and an electric motor having a stator and an armature which is aligned with the drive spindle. The drive device and the motor housing move with the drive spindle as co-vibrating units during an operation of the separator.

Separators of this type are suitable in continuous operation for industrial use and are known. The known systems include constructions in which the drum, the driving spindle and the electric driving motor are connected rigidly to form a constructional unit which is then elastically supported as a whole on a machine frame. Examples of prior art of this type are disclosed in FR 1,287,551, DE-B 1 057 979 and DE 43 14 440 C1.

The prior art also includes DE 198 13 436 A1 and GB 344 224 A, which disclose a driving spindle for the centrifugal drum, said driving spindle being mounted rotatably by means of a bearing in a housing which is supported elastically on a machine frame. Also see WO 00/78 465 A1 and U.S. Pat. No. 6,428,460 A1.

WO 2007/125066 A1 also discloses a separator with a direct drive, the driving device of which has an electric driving motor with a stator, and a motor armature which is aligned with the driving spindle. The stator is connected rigidly to the machine frame, and the motor armature, the driving spindle, the centrifugal drum and the housing form a unit which is supported elastically on the machine frame and vibrates during operation.

Against this background, the present disclosure relates to improvements on the design of separators comprising a direct drive.

The present disclosure thus includes a centrifugal drum having a vertical axis of rotation and a feed line for material to be centrifuged. A drive spindle for the centrifugal drum is rotatably mounted on a housing via a bearing. The housing is supported elastically on a machine frame. A drive device includes a motor housing and an electric motor having a stator and an armature which is aligned with the drive spindle. The drive device and the motor housing move with the drive spindle as co-vibrating units during an operation of the separator. The drive device is connected to the machine frame below the bearing at a lower axial end of the bearing via one or more joint elements. A stiffness of the one or more joint elements in an installed state with respect to the axis of rotation is smaller in an axial direction than a stiffness in a radial direction.

The motor is fixed in a suitable manner, for example, in the radial direction but can carry out the same axial movements as the driving spindle that occur during operation.

The stiffness of the joint element(s) in the installed state is, for example, less than half the size or amount in the axial, or vertical, direction than the stiffness in the radial direction. That is to advantageously ensure movement together in the axial direction.

For example, this can be realized in a simple manner by the joint element or joint elements being designed as sheet-metal parts.

It is, therefore, within the scope of the present disclosure to provide one annular sheet-metal disk or a plurality of annular segments or sheet-metal strips distributed around the circumference as the joint element. Sheet-metal elements of this type are cost effective and can be integrated into the construction in a simple manner.

Other aspects of the present disclosure will become apparent from the following descriptions when considered in conjunction with the accompanying drawings.

BRIEF DESCRIPTION OF THE DRAWING

The sole FIGURE shows a sectional view of a driving region of a separator, according to the present disclosure, in which embodiments of lubricant containers are shown on the right and left of the axis of rotation.

DETAILED DESCRIPTION

The sole FIGURE shows a separator 1 with a centrifugal drum 2, indicated schematically, with a vertical axis of rotation D. The centrifugal drum 2 is placed onto a driving spindle 3. The driving spindle 3 is mounted rotatably in a housing 6 by a bearing which here comprises an upper or neck bearing 4 and a lower or footstep bearing 5. For example, the neck bearing 4 includes two rolling bearings. Other embodiments, within the scope of the present disclosure, may, for example, have only one rolling bearing as the neck bearing 4 (not shown). It is also within the scope of the present disclosure to provide two footstep bearings 5.

The housing 6 is supported by elastic elements 7, 8, which may, for example, be rubber elements or rubber rings. Elements 7, 8 are located on an annular machine frame portion 9 which is designed as a separate or integrated part of a primary machine frame 32 into which the driving spindle 3 projects.

A separator drive includes an electric motor 10 and a motor housing 13. The drive includes a stator 11 or a stator winding and a motor armature 12 and serves to drive the centrifugal drum 2.

The driving spindle 3 is connected to the motor armature 12 directly. That is, without interconnected elements, such as a coupling. The motor housing 13 together with the stator 11 is fitted onto the housing 6. For example, the motor housing 13 is bolted directly at the bottom onto the housing 6 by bolts 14 or studs or the like. The motor housing has a lower covering 15.

The bearing element 4, 5 are arranged axially between the motor 10 and the centrifugal drum 2.

The elastic elements 7, 8 comprise a plurality of arrangements which are oriented perpendicularly to each other distributed around the circumference. This results in a defined setting of the point of articulation or pivot point. The selected arrangement affords the advantage of it being readily and easily possible to coordinate the spring properties by varying the location and design of the elastic elements 7, 8.

The arrangement of the pairs of elastic elements 7, 8 is selected such that the first elements 7 have center longitudinal axes which are oriented parallel to the axis of rotation D, and the second elastic elements 8 have longitudinal axes which are oriented radially perpendicularly to the axis of rotation D.

The machine frame portion 9 has a stepped shape including wall sections 16, 17 in which the elastic elements 7, 8 are supported.

It is within the scope of the present disclosure to provide encircling rubber rings as the elastic elements 7, 8.

The housing 6 has an upper flange-like region 18. On a lower side 19 and on an outer circumference 20 of region 19 the elastic elements 7, 8, which face away from the machine frame portion 9, are supported.

The flange-like region 18 is adjoined on an inside by an axially downwardly extending cylindrical housing region 21 which surrounds the driving spindle 3. The neck and footstep bearings 4, 5 are arranged spaced apart between an inner circumference of the housing region 21 and an outer circumference of the driving spindle 3.

Radially further on the outside, the housing 6 includes an expanding collar 22 downwardly adjoining the flange-like region 18.

A lubricant collecting container 23, which is configured in the manner of an annular space/torus and has boundary walls 24, 25 tapering upward and downward, is arranged in a space bounded upward and radially to the outside by housing collar 22 and downward by the armature 12 of the motor 10 and inward by the housing region 21 and, further at the bottom by the driving spindle 3.

The lower region of the lubricant collecting container 23 is connected in a rotationally fixed manner to the driving spindle 3 in a region 26 such that oil collects radially on the outside in the container 23 during operation. The container 23 bears upward in a manner sealed virtually against the housing 6, but is rotatable relative to the housing 6.

The lubricant collecting container 23 can be, within the scope of the present disclosure, integrated into the construction as a co-rotating element and can nevertheless have an advantageously large volume.

By way of example, the lubricant container 23 which is shown, for example, somewhat higher vertically, left to right, and, if appropriate, somewhat shorter radially, top to bottom, on the left of the axis of rotation D than is illustrated on the lubricant container 23 on the right of the axis of rotation D. The container 23 may be configured to be rotationally symmetrical.

In an embodiment according to the present disclosure, a tubular or hose-like attachment 28 projects into a lower region of the lubricant collecting container 23 as a way for conveying oil. The attachment 28 is arranged and designed in such a manner that, during operation, it enters the lubricant, for example an oil, which has collected on the outside in the lubricant collecting container 23. The attachment 28 projects into a radial bore 29 in the housing 6, which merges into a lubricant channel 30 extending axially into the region above the neck bearing 4. This arrangement, which is in the manner of a stripping disk, serves to convey the lubricant out of the lubricant collecting container 23 into the region between the inner circumference of the housing 6 and the outer circumference of the driving spindle 3 above the neck bearing 4.

For better guidance, the tube 28 may also be curved counter to the direction of rotation.

During rotations of the driving spindle 3, oil is guided to the outside and, at the level of an inlet of tubular or hose-like attachment 28, pumped upward through the lubricant channel 30.

Lubricant emerging from the lubricant channel 30 is then run downward through the neck and footstep bearings 4, 5 and from there downward back into the lubricant collecting container 23.

In this way, a complete lubricant circuit, which is designed in a defined manner and operates reliably and is intended for lubricating the bearing of the driving spindle 3, is realized in a very confined space. The region of the driving motor 10 is separated in a simple manner from the lubricant system or circuit. Below the bearings 4, 5, the driving region has only a minimum vertical extent.

The rotating lubricant collecting container 23 also affords an advantage that heat can readily be dissipated to the outside by the container 23. Surface increasing means, such as cooling ribs and conveying ribs, can, within the scope of the present disclosure, also be integrated on the inside or outside of the container 23.

Since the entire driving device together with the motor housing 13 carries out the same movements as the driving spindle 3 as a co-moving and co-vibrating unit during operation, it is within the scope of the present disclosure to connect the driving device below the bearing 4, 5 at a lower axial end thereof. That would be via at least one or more elastic joint elements 31 to the machine frame 32 on which the machine frame portion 9 is arranged or formed. The stiffness of the joint element(s) in the installed state is, for example, less than half the size or amount in the axial, or vertical, direction than the stiffness in the radial direction. That is to advantageously ensure movement together in the axial direction. For example, this can be realized in a simple manner by the joint element or joint elements being designed as sheet-metal parts.

Sheet-metal strips 33, which are oriented radially and are arranged distributed around the circumference, are used as the at least one or more joint elements 31. The main plane of extent of the planar sheet-metal elements 33 is perpendicular to the axis of rotation D. The sheet-metal strips 33 bridge a gap 34 between the motor 10, in particular between the driving housing 13, and the machine frame 32, and fix the lower end of the motor 10 in the radial direction in a suitable manner. The sheet-metal strips 33 can, for example, be fastened to the driving housing 13 and the machine frame 32 by studs or bolts 35.

For cooling purposes, the lower covering 15, for example, could include one or more openings, and a further opening could be provided in the region of the housing 6 or machine frame 32 above the motor 10 such that, during operation, a stream of air passes the motor 10 in the manner of a ventilator. In the covering 15, a diameter, which is smaller than the outside diameter of the collecting container 23 would be selected for the openings in order to obtain a cooling effect in the manner of a ventilator. A ribbed arrangement on the collecting container 23, for example at the bottom, would further increase that effect.

It is within the scope of the present disclosure to integrate a cooling circuit for a fluid into the motor housing 13 or at another suitable point. In the covering 15, a diameter which is smaller than the outside diameter of the collecting container 23, could be selected for the openings in order to obtain a cooling effect in the manner of a ventilator.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A separator comprising:
a centrifugal drum having a vertical axis of rotation and a feed line for material to be centrifuged;
a drive spindle for the centrifugal drum rotatably mounted on a housing via a bearing, the housing being supported elastically on an upper portion of a machine frame;
a drive device including a motor housing and an electric motor having a stator and an armature which is aligned with the drive spindle, the drive device and the motor housing moving with the drive spindle as co-vibrating units during an operation of the separator; and
one or more joint elements arranged below the machine frame and the motor housing, wherein the one or more joint elements couple the machine frame to the motor housing;
wherein a stiffness of the one or more joint elements in an installed state with respect to the axis of rotation being smaller in an axial direction than a stiffness in a radial direction,
wherein the stiffness of the one or more joint elements in the installed state being less than half the amount in the axial direction than the stiffness in the radial direction, and
wherein the one or more joint elements are configured as planar sheet-metal parts with a main planar surface thereof disposed perpendicular to the axis of rotation.

2. The separator as claimed in claim 1, wherein the sheet-metal parts bridge a gap between the motor and the machine frame.

3. The separator as claimed in claim 1, further comprising a lubricant system for lubricating the bearing, which lubricant system is configured as a lubricant circuit and includes a lubricant collecting container.

4. The separator as claimed in claim 3, wherein the entire lubricant circuit together with the lubricant collecting container is arranged axially above the armature of the electric motor.

5. The separator as claimed in claim 3, wherein the lubricant collecting container surrounds the driving spindle in the manner of a torus.

6. The separator as claimed in claim 3, wherein the lubricant collecting container is configured to include one cone.

7. The separator as claimed in claim 3, wherein the lubricant collecting container is configured to include an element which rotates together with the drive spindle during an operation.

8. The separator as claimed in claim 3, wherein the lubricant collecting container is connected to the drive spindle in a rotationally fixed manner.

9. The separator as claimed in claim 3, further including a conveying member for a lubricant, the conveying member dipping into the lubricant collecting container to convey the lubricant.

10. The separator as claimed in claim 9, wherein the conveying member serves to convey the lubricant out of the lubricant collecting container in the manner of a stripping disk into a region between an inner circumference of the housing and an outer circumference of the drive spindle above the bearing from where the lubricant runs downward through the bearing and downward from there back into the lubricant collecting container.

11. The separator as claimed in claim 3, wherein the lubricant collecting container is configured to include two cones.

12. The separator as claimed in claim 1, wherein the housing is supported on the machine frame by elastic elements that are rubber elements.

13. The separator as claimed in claim 12, wherein the elastic elements include a plurality of paired arrangements of two elastic elements which are oriented perpendicularly to each other and distributed around the circumference of the housing.

14. The separator as claimed in claim 12, wherein the elastic elements include two rubber rings which are oriented perpendicularly to each other.

* * * * *